United States Patent [19]

Zavatkay et al.

[11] 4,365,690
[45] Dec. 28, 1982

[54] SPRING CARTRIDGE FOR SPRING OPERATED RE-WIND MECHANISM

[75] Inventors: Robert J. Zavatkay, Torrington; George W. Kurasz, Bristol; Robert R. Devaux, Northfield, all of Conn.

[73] Assignee: Barnes Group Inc., Bristol, Conn.

[21] Appl. No.: 192,620

[22] Filed: Sep. 30, 1980

Related U.S. Application Data

[62] Division of Ser. No. 957,724, Nov. 6, 1978, Pat. No. 4,261,437.

[51] Int. Cl.³ ............................. F16F 1/12; F03G 1/00
[52] U.S. Cl. ........................................ 185/45; 267/156
[58] Field of Search ..................... 185/34, 37, 39, 45, 185/DIG. 1; 46/206; 267/156; 123/185 BA

[56] References Cited

U.S. PATENT DOCUMENTS

| | | | |
|---|---|---|---|
| 3,393,771 | 7/1968 | Lohr et al. | 185/37 |
| 3,739,763 | 6/1973 | Berry | 123/185 BA X |
| 4,019,490 | 4/1977 | Reese | 123/185 BA |
| 4,053,029 | 10/1977 | Darda | 185/39 |
| 4,130,182 | 12/1978 | Aunspach | 185/45 |

*Primary Examiner*—Allan D. Herrmann
*Attorney, Agent, or Firm*—Scrivener, Clarke, Scrivener and Johnson

[57] ABSTRACT

The disclosure is of a spring cartridge for a spring operated re-wind mechanism such, for example, as those used with pull cord type engine starters.

1 Claim, 4 Drawing Figures

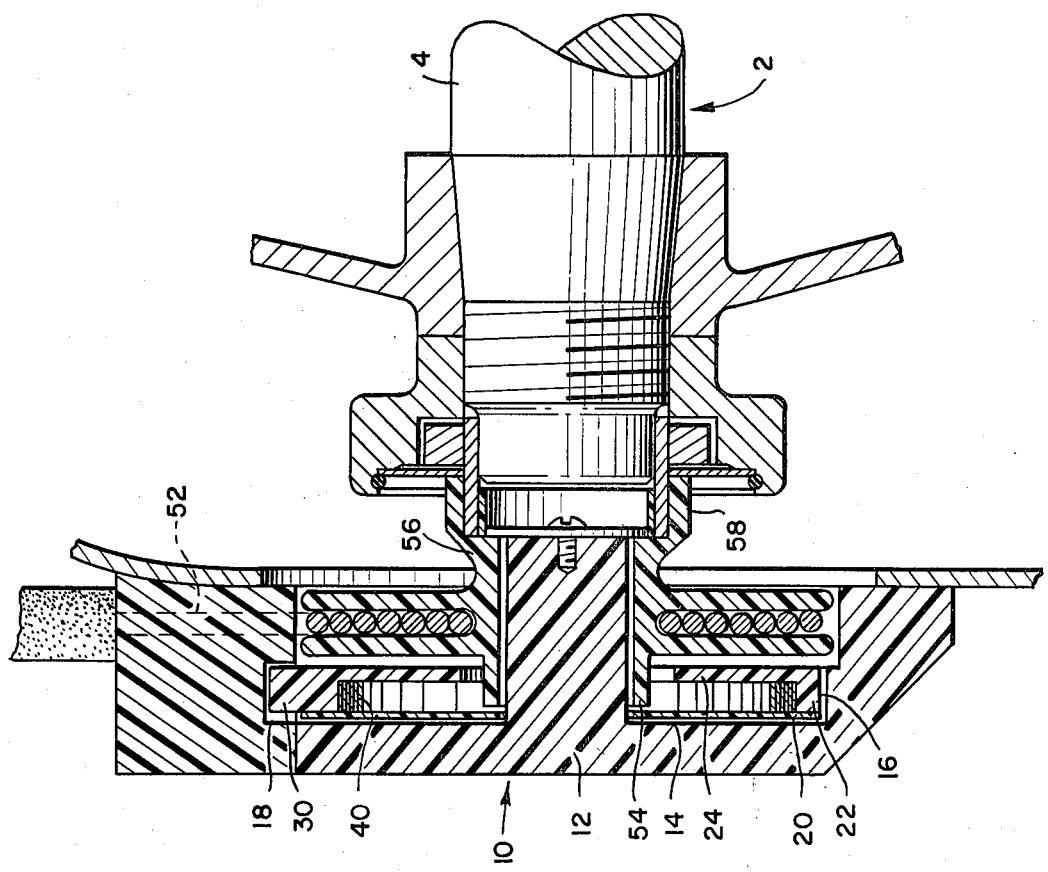
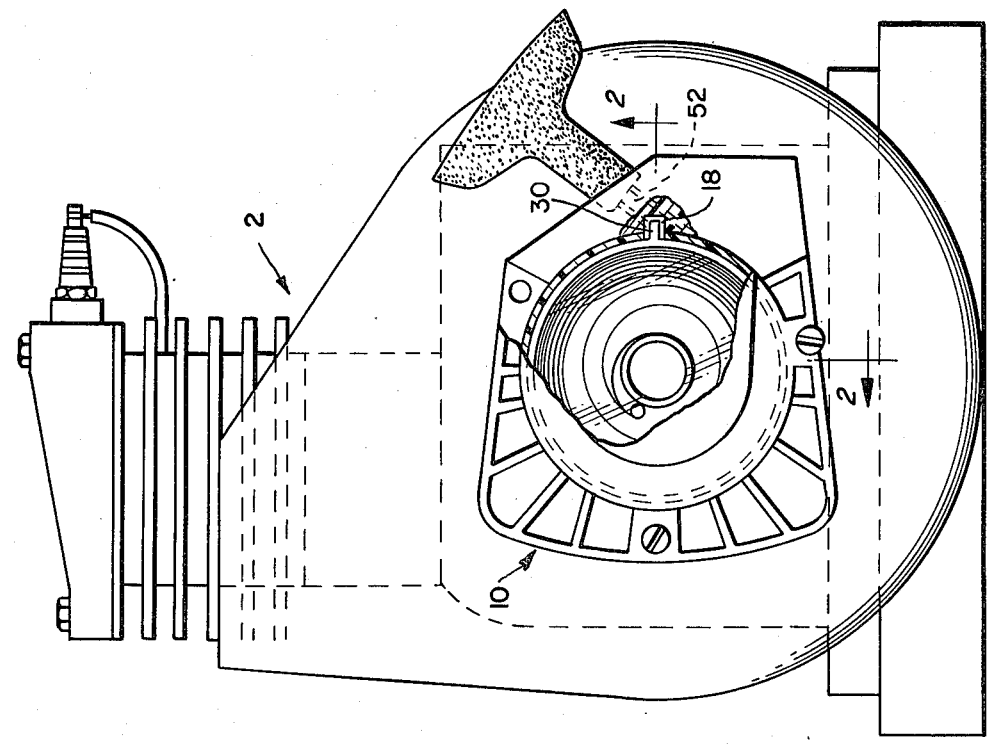

SPRING CARTRIDGE FOR SPRING OPERATED RE-WIND MECHANISM

RELATION TO OTHER CASES

This application is a division of our co-pending application Ser. No. 957,724 filed Nov. 6, 1978 now U.S. Pat. No. 4,261,437 for a Spring Operated Re-Wind Mechanism.

SUMMARY OF THE INVENTION

The invention provides a spring cartridge for a spring operated re-wind mechanism in which a backwound spiral spring is used to provide the re-winding energy.

DESCRIPTION OF THE DRAWINGS

FIG. 1 is an end view of an internal combustion engine showing a re-wind mechanism in connection with a pull cord type of starter;

FIG. 2 is an enlarged sectional view taken on line 2—2 of FIG. 1;

DESCRIPTION OF THE INVENTION

Figure 3:
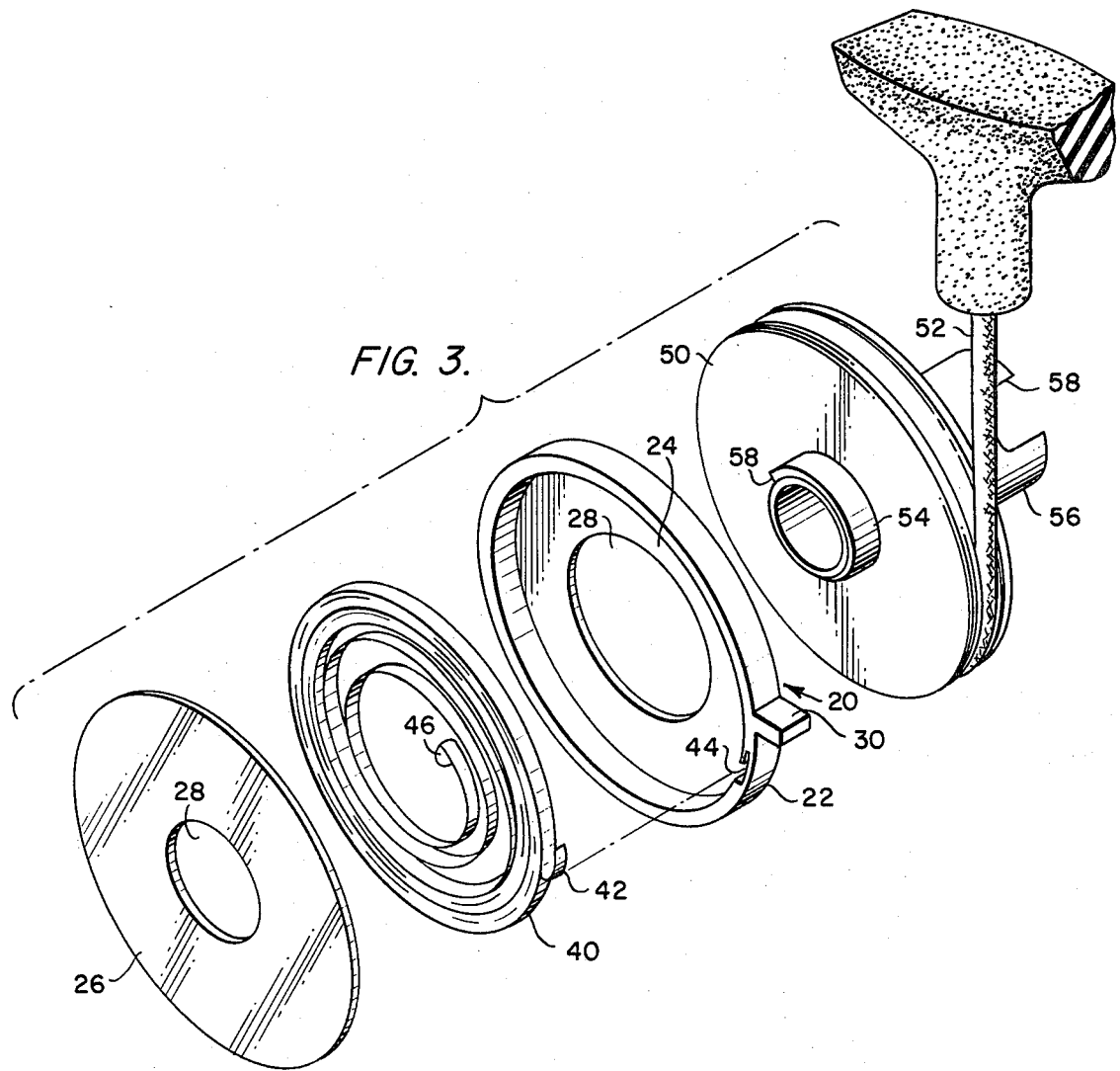
FIG. 3 is an exploded view showing the parts of the re-wind mechanism.

This invention relates broadly to spring operated re-wind mechanisms which are used in a great variety of domestic, industrial and power plant applications such, for example, as pull cord engine starters, hose reels, vacuum cord reels and the like, and it will be described in this specification in connection with a pull cord type engine starter mechanism.

Starter mechanisms of the pull cord type for use with mowers, outboard marine engines and the like are conventionally provided with a re-wind mechanism for returning the pull cord and its pulley to their at-rest positions, and known devices of this type almost universally use a spiral power spring as the means for providing the re-winding energy. A typical re-wind mechanism is disclosed in U.S. Pat. No. 2,564,787 to Mack, and it will be seen that it includes a spiral power spring which in its normal operative position is in a spiral configuration positioned adjacent an annular retainer for the spring. Operation of the pull cord in such a mechanism causes the spring to be at least partially wound down on the central shaft from its normal position, thus storing energy which is utilized on release of the pull cord to re-wind the cord on its pulley and return the parts to condition for another start.

In addition to the spiral power spring another spiral spring is available commercially under the trademark Spirator and is described and claimed in U.S. Pat. Nos. 2,833,027 and 2,833,534 to Foster. This spring is back-wound in its normal condition and throughout its entire range of operation, being normally in engagement with and bearing outwardly against a cylindrical retainer and being wound down onto a central shaft to store energy which is delivered upon return of the spring to its normal condition. This type of spring can produce much greater energy than the power spring but it is unstable in all conditions and requires special handling, and for this reason its use in re-wind mechanisms has not been proposed as it has been assumed that such use would not be possible without danger to persons installing the springs or servicing the motors, or to users.

It has been the principal object of this invention to provide a spring cartridge for a re-wind mechanism which incorporates a backwound spring but is provided in a configuration which is not only safe to handle but permits easy and quick installation and replacement.

A pull cord re-wind mechanism of the type with which the invention is useful is illustrated in the drawings in association with an internal combustion engine 2 having a crankshaft 4, which may have utility as the driving means for any stationary or mobile unit such, for example among the latter category, as mowers, outboard motors and the like.

The re-wind mechanism and its associated parts comprises a housing 10 which is connected to the motor by bolts or the like and which may be dome shaped. A shaft 12 extends centrally and inwardly of the housing toward and in axial alignment with the crankshaft 4. The inner surface of the housing surrounding the shaft 12 is formed as an open cylindrical recess 14, the wall 16 of which surrounds and is concentric with the housing shaft 12. A groove or recess 18 extends radially, tangentially or otherwise outwardly from the recess 14 into material of the housing which surrounds and defines the recess.

Figure 4:
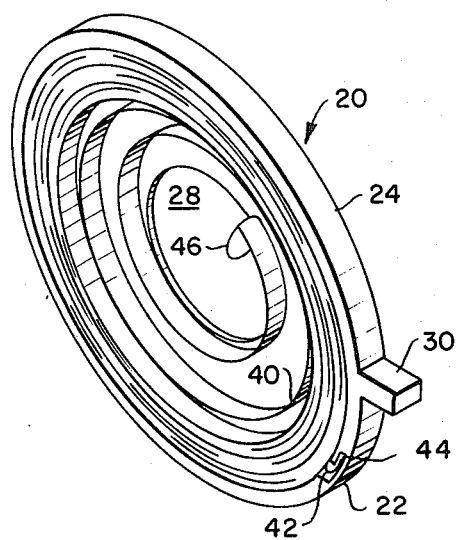
FIG. 4 is a perspective view of the spring cartridge provided by the invention.

Spring means of a novel form for re-winding mechanisms are provided by the invention and comprise a spring cartridge which takes the form of a hollow cylindrical casing 20 the thickness and diameter of which are such, in the mechanism being described, that it may be snugly received within the recess 14. In its preferred form, which is shown in FIG. 4, the casing has an annular wall 22, a side wall 24 having a central opening 28 therein which is concentric with the annular wall 22 of the casing and through which the housing shaft 12 extends when the spring cartridge is in the recess 14 and the parts are assembled. Side wall 24 and the annular wall 22 are preferably formed integrally from a single piece of synthetic plastic or other suitable material providing a cup shaped casing. A tang 30 projects radially outwardly from the annular wall of the casing and is of the same size and shape as the radial groove 18 so that when the casing is positioned within the recess 14 the tang is snugly received within the groove and prevents rotation of the casing with respect to the housing.

Within the casing 20 there is positioned and held a back-wound spiral spring 40 which is constructed and operable in the manner described in the Foster patents referred to above. The outer convolution of the spring is permanently held and restrained in its normal back-wound condition by the annular wall 22 and the side wall 24 of the casing, and the remainder of the spring extends in an open spiral configuration toward and to the center of the casing 20. The outer end of the spring has a turned-back part 42 which is snugly received within a right-angle shaped slot 44 in the annular wall of the casing to connect the outer end of the spring to the casing, and the inner end of the spring is turned into a circle or other shape to provide an abutment 46 which is positioned within the central opening 28 of the casing.

A pull-cord assembly of the type with which the invention is useful is disclosed and comprises a pulley 50 having a deep radial groove to the interior of which there is connected the inner end of a pull cord 52 the outer end of which is provided with a handle. The pulley is provided with two central hubs 54, 56 which extend axially outwardly from the opposite side faces of the pulley. Hub 54 extends from one side face of the pulley toward the spring cartridge and through the central opening 28 in the cartridge and is hollow and surrounds and is journaled on the housing shaft 12. On its outer surface and positioned within the spring 40 the outer surface of hub 54 is provided with a radially extending surface 58 which provides an abutment positioned adjacent the abutment 46 on the inner end of the spring. The second hub 56 extends from the other side face of the pulley toward the crankshaft 4 and is axially aligned therewith and is provided with means 58 which engage the crankshaft during the starting cycle of the motor.

The spring cartridge comprising the casing 20 with its exterior radial tang 30 and the backwound spring within the casing and connected at its outer end to the casing, with its inner end abutment 46 within the central opening of the casing, forms a unitary package which may be handled without danger from the spring, and which may be dropped into the housing recess 14 with the tang in groove 18, after which the pulley, spring cartridge and housing 10 may be attached to the motor for starter operation. It will be apparent that the spring cartridge may be removed and replaced at any time without difficulty or danger. In a preferred form of the invention the cartridge has the single side wall 24 with the central opening 28 in it, but it may have two side walls for certain installations, and in either case the casing with the spring within it provides a stable assembly which fulfills all of the requirements of the invention.

It will be understood that in order to cause the spring to re-wind the pull cord at least part of the backwound spring must be wound down onto the pulley hub 54 and that this is accomplished by engagement of the pulley hub abutment 58 with spring abutment 46 followed by further rotation of the pulley. The spring abutment must, of course, be moved in the proper direction to wind the spring down, and this requires that the spring cartridge be properly placed within the housing recess 14 in order to properly present the spring abutment to the hub abutment. While this may be done by observation, means are provided by the invention for facilitating this placement, and this is done by differentiation of the two sides of the spring cartridge. This is accomplished, of course, by the cartridge described above which has a closed and an open side wall. Another means comprises the provision of a spring cartridge having two side walls which are of different appearance, as by making one side wall of the cartridge from opaque material and the other side wall from transparent material. In either case proper placement will be achieved by placing the cartridge in the housing recess with a pre-determined side up.

While this specification has described a spring cartridge for a spring operated re-wind mechanism for an engine starting apparatus, it will be understood that the invention is useful with, and applicable to, any other spring operated re-wind mechanism.

We claim:

1. As a new article of manufacture, a spring cartridge for insertion into an open circular recess, which includes an outwardly extending radial slot, in an engine to form part of a re-wind mechanism, comprising a cylindrical casing of substantially the same diameter and depth as the recess and having a peripheral wall and sides of different appearances and having a central opening which is concentric with the peripheral wall, a backwound spiral spring within the casing with its outer convolution bearing against the peripheral wall of the casing and connected thereto, the inner end of the spring having an abutment formed thereon which is positioned within the central opening in the casing, and a tang connected to the peripheral wall and extending outwardly therefrom and having substantially the same size and shape as the radial slot of the recess.

* * * * *